(12) United States Patent
Oohira et al.

(10) Patent No.: US 12,283,386 B2
(45) Date of Patent: *Apr. 22, 2025

(54) CHEMICAL DECONTAMINATION METHOD AND CHEMICAL DECONTAMINATION APPARATUS

(71) Applicant: Hitachi-GE Nuclear Energy, Ltd., Hitachi (JP)

(72) Inventors: Takashi Oohira, Hitachi (JP); Satoshi Oouchi, Hitachi (JP); Motohiro Aizawa, Hitachi (JP); Nobuyuki Ota, Hitachi (JP); Hideyuki Hosokawa, Tokyo (JP); Ryo Hamada, Tokyo (JP); Hiroo Yoshikawa, Osaka (JP); Naobumi Tsubokawa, Osaka (JP); Masahiko Kazama, Osaka (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 566 days.

This patent is subject to a terminal disclaimer.

(21) Appl. No.: 17/197,437

(22) Filed: Mar. 10, 2021

(65) Prior Publication Data

US 2021/0296019 A1    Sep. 23, 2021

(30) Foreign Application Priority Data

Mar. 17, 2020  (JP) .................. 2020-046084

(51) Int. Cl.
*G21F 9/00* (2006.01)
*B01D 15/12* (2006.01)
(Continued)

(52) U.S. Cl.
CPC ............. *G21F 9/004* (2013.01); *B01D 15/12* (2013.01); *B01D 15/362* (2013.01); *B01J 39/24* (2013.01); *G21F 9/12* (2013.01)

(58) Field of Classification Search
CPC ......... Y02E 30/30; Y02E 30/00; G21F 9/002; G21F 9/004; G21F 9/001; G21F 9/04;
(Continued)

(56) References Cited

U.S. PATENT DOCUMENTS

| 6,335,475 B1 | 1/2002 | Nagase et al. |
| 2002/0099252 A1* | 7/2002 | Nagase .................. G21F 9/004 588/1 |

(Continued)

FOREIGN PATENT DOCUMENTS

| JP | H0763893 A * | 3/1995 |
| JP | 2000-105295 A | 4/2000 |

(Continued)

OTHER PUBLICATIONS

Machine generated translation of JP-2018054538-A (Year: 2018).*

(Continued)

*Primary Examiner* — Magali P Slawski
*Assistant Examiner* — Bernadette Karen McGann
(74) *Attorney, Agent, or Firm* — Crowell & Moring LLP

(57) ABSTRACT

Provided are a chemical decontamination method and a chemical decontamination apparatus capable of preventing deterioration of a metal ion exchange resin and performing decontamination at a low cost in a short time.
The chemical decontamination method of the invention includes: a reduction decontamination step of supplying a reduction decontamination solution to a decontamination target portion and performing reduction decontamination on a surface of a member constituting the decontamination target portion; a hydrogen peroxide decomposition step of decomposing hydrogen peroxide contained in the reduction decontamination solution after the reduction decontamination step; and a metal ion removing step of removing a metal (Continued)

ion contained in the reduction decontamination solution after the hydrogen peroxide decomposition step.

8 Claims, 5 Drawing Sheets

(51) Int. Cl.
  *B01D 15/36*   (2006.01)
  *B01J 39/24*   (2017.01)
  *G21F 9/12*    (2006.01)
(58) Field of Classification Search
  CPC ..... G21F 9/06; G21F 9/20; G21F 9/26; G21F 9/24; G21F 9/22; G21F 9/18; G21F 9/16; G21F 9/14; G21F 9/12; G21F 9/10; G21F 9/08; G21F 9/125; G21F 9/162; G21F 9/167; G21F 9/165; G21F 9/00; G21F 9/008; G21C 17/0225; G21C 19/28; G21C 19/307; G21C 13/00; G21C 19/32; G21C 19/00; G21C 19/02; G21C 1/00; G21D 1/00; G21D 3/04; C02F 2101/006; C02F 1/66; C02F 1/722; C02F 1/725; C02F 2305/026; C02F 1/283; C02F 1/42; C02F 2001/422; C02F 1/28; C02F 2001/425; C02F 2001/427; C01B 15/01; C01B 13/0214; B01D 2251/106; B01D 2253/102; B01D 15/361; B01D 15/362; B01D 15/363; B01D 15/364; B01D 15/00; B01D 2253/206; C07B 33/00; B01J 20/20; B01J 20/00; B01J 21/18; B01J 21/16; B01J 20/3416; B01J 20/12; B01J 31/08; B01J 47/00; B01J 47/026; B01J 43/00; B01J 37/30
  See application file for complete search history.

(56) References Cited

U.S. PATENT DOCUMENTS

| | | | |
|---|---|---|---|
| 2002/0150523 A1* | 10/2002 | Nagase | G21F 9/004 |
| | | | 422/159 |
| 2008/0156735 A1* | 7/2008 | Ohashi | C02F 9/00 |
| | | | 210/198.1 |
| 2018/0080115 A1* | 3/2018 | Itou | C23C 14/14 |

FOREIGN PATENT DOCUMENTS

| | | | | |
|---|---|---|---|---|
| JP | 2000-121791 A | | 4/2000 |
| JP | 2005-134407 A | | 5/2005 |
| JP | 2006-38684 A | | 2/2006 |
| JP | 2006038684 A | * | 2/2006 |
| JP | 2009-162687 A | | 7/2009 |
| JP | 2018054538 A | * | 4/2018 |
| JP | 2018-159647 A | | 10/2018 |
| JP | 2019-108600 A | | 7/2019 |

OTHER PUBLICATIONS

Machine generated translation of JPH0763893 A (Year: 1995).*
Machine generated translation of JP-2006038684-A (Year: 2006).*
Japanese-language Office Action issued in Japanese Application No. 2020-046084 dated Aug. 29, 2023 with English translation (8 pages).

* cited by examiner

CHEMICAL DECONTAMINATION METHOD AND CHEMICAL DECONTAMINATION APPARATUS

CLAIM OF PRIORITY

The present application claims priority from Japanese Patent application serial No. 2020-046084, filed on Mar. 17, 2020, the content of which is hereby incorporated by reference into this application.

BACKGROUND OF THE INVENTION

1. Field of the Invention

The present invention relates to a chemical decontamination method and a chemical decontamination apparatus.

2. Description of the Related Art

For example, a boiling water nuclear power plant (hereinafter referred to as "BWR plant") includes a nuclear reactor with a built-in reactor core in a reactor pressure vessel (hereinafter referred to as "RPV"). Reactor water supplied to the reactor core by a recirculation pump (or an internal pump) is heated by heat generated by fission of nuclear fuel materials in a fuel assembly loaded in the reactor core, and a part of the reactor water becomes steam. The steam is guided from the RPV to a turbine to rotate the turbine. The steam discharged from the turbine is condensed into water by a condenser. The water is supplied as feed water into the nuclear reactor. In order to prevent the generation of radioactive corrosion products in the RPV, mainly metal impurities are removed from the reactor water by a filtration desalination device provided in a feed water pipe. The reactor water refers to cooling water existing in the RPV.

Corrosion products that are sources of radioactive corrosion products are generated on a surface of a component of the BWR plant such as the RPV and a recirculation system pipe in contact with the reactor water, and thus stainless steel, a nickel-based alloy, etc., which are less corrosive, are used in main components of a primary system. In addition, the RPV made of low-alloy steel has a stainless steel hard facing on an inner surface to prevent the low-alloy steel from coming into direct contact with the reactor water. Further, the filtration desalination device of a reactor cleanup system cleans up a part of the reactor water and positively removes a small amount of metal impurities contained in the reactor water.

However, even if the above-mentioned corrosion countermeasure is taken, it is not possible to avoid a very small amount of metal impurities in the reactor water, and thus a part of the metal impurities, as metal oxides, adhere to a surface of a fuel rod contained in the fuel assembly. Metal elements contained in the metal impurities adhered to the surface of the fuel rod cause nuclear reactions by irradiation of neutrons emitted from nuclear fuel materials in the fuel rod, and become radionuclides such as cobalt 60, cobalt 58, chromium 51, and manganese 54. Most of these radionuclides remain adhered to the surface of the fuel rod are in a form of oxides, and a part of these radionuclides are eluted as ions in the reactor water in accordance with solubility of the oxides taken in, or re-emitted into the reactor water as insoluble solids called clad. Radioactive materials in the reactor water are removed by the reactor cleanup system. However, radioactive materials that have not been removed, together with the reactor water, are accumulated on surfaces of components in contact with the reactor water while circulating in a recirculation system or the like. As a result, radiation is emitted from the surfaces of the components, causing radiation exposure of workers during periodic inspection work. An exposure dose of a worker is managed so as not to exceed a prescribed value for each worker. In recent years, it is necessary for the prescribed value to be lowered, and the exposure dose of each person to be economically as small as possible.

A chemical decontamination method is used to remove the components of a nuclear power plant that have experienced operation, for example, an oxide film containing radionuclides such as cobalt 60 and cobalt 58 formed on the surface of the pipe, by dissolution with chemicals. In the chemical decontamination, mainly reduction decontamination that removes films of the metal oxides using a reducing agent and oxidation decontamination that oxidates and dissolves chromium in the metal oxides as hexavalent chromium using an oxidizing agent are carried out.

The following patents disclose techniques relating to this chemical decontamination method. For example, JP-A-2000-105295 (Patent Literature 1) describes a method of adding hydrogen peroxide 3 times or more the equivalent of hydrazine to a downstream of a cation exchange resin tower and decomposing a reduction decontamination solution by using a ruthenium-supported carbon particle catalyst. Patent Literature 1 discloses that with a reduction decontamination solution decomposition device that can selectively decompose oxalic acid and hydrazine used for the reduction decontamination, it is possible to selectively decompose hydrazine, which is a load on the cation exchange resin tower, and set pH higher than that of a decontamination solution using oxalic acid alone, and thus decontamination is possible even when a material with low corrosion resistance is contained.

JP-A-2005-134407 (Patent Literature 2) describes a chemical decontamination method of installing a catalyst tower at a front stage of a cation exchange resin tower to decompose hydrazine during reduction decontamination and to reduce the load of the cation resin.

JP-A-2000-121791 (Patent Literature 3) discloses that a dense oxide film with high corrosion resistance can be formed in a short time in high temperature water by removing, with hydrogen peroxide, iron oxalate formed on a surface of a metal member during reduction decontamination using oxalic acid, and bringing hydrogen peroxide into contact with a clean surface from which iron oxalate has been removed. The adhesion of radionuclides during plant operation can be significantly prevented by the dense oxide film with high corrosion resistance.

JP-A-2009-162687 (Patent Literature 4) describes a method of bringing hydrogen peroxide and catalase into contact with a surface of a decontamination target after reduction decontamination and oxidation decontamination and removing a residual oxide film by oxygen bubbles generated in a decomposition reaction of hydrogen peroxide.

JP-A-2018-159647 (Patent Literature 5) describes a method of reducing at least a part of trivalent Fe ions dissolved in a reduction decontamination solution by reduction decontamination using an ultraviolet irradiation device to improve removal efficiency of an ion exchange resin. As a result, it is possible to significantly prevent adhesion of a Fe oxide to a catalyst of a catalyst tower in a rear stage.

In the chemical decontamination, passing through the cation resin in the presence of hydrogen peroxide in the decontamination solution causes deterioration of the cation resin. There are two generation sources of hydrogen peroxide. The first is (1) generated by radiolytic decomposition of water in high-dose decontamination in the reactor. The second is that (2) hydrogen peroxide injected into the reduction decontamination solution after passing through the cation resin for the purpose of decomposing the reducing agent leaks to the rear stage of the catalyst tower. In Patent Literature 1, the catalyst tower is installed downstream of the cation exchange resin, and thus hydrogen peroxide from the above-mentioned two generation sources may be supplied to the cation exchange resin tower. In addition, in Patent Literature 2, the catalyst tower is installed in front of the cation resin, and thus hydrogen peroxide from the generation source (1) may be decomposed, but hydrogen peroxide from the generation source (2) may be supplied to the cation exchange resin tower.

Deterioration of the cation exchange resin decreases the ability of the cation resin to exchange metal ions. In addition, polystyrene sulfonic acid generated due to deterioration is adsorbed on an anion resin used for cleaning up the decontamination solution, resulting in decreased the performance of cleaning up the decontamination solution. As a result, the amount of each resin used increases, leading to an increase in decontamination costs.

As described above, the deterioration of the cation exchange resin increases various problems, and therefore it is desired to reduce the concentration of hydrogen peroxide contained in the reduction decontamination solution passing through the cation exchange resin, as much as possible.

SUMMARY OF THE INVENTION

An object of the invention is, in view of the above-mentioned circumstances, to provide a chemical decontamination method and a chemical decontamination apparatus capable of preventing the deterioration of a metal ion exchange resin and performing decontamination at a low cost in a short time.

An aspect of a chemical decontamination method of the invention to achieve the above-mentioned object includes: a reduction decontamination step of supplying a reduction decontamination solution to a decontamination target portion and performing reduction decontamination on a surface of a member constituting the nuclear reactor; a hydrogen peroxide decomposition step of decomposing hydrogen peroxide contained in the reduction decontamination solution after the reduction decontamination step; and a metal ion removing step of removing a metal ion contained in the reduction decontamination solution after the hydrogen peroxide decomposition step.

An aspect of a chemical decontamination apparatus of the invention to achieve the above-mentioned object includes: a reduction decontamination solution injection device configured to supply a reduction decontamination solution to a decontamination target portion; a hydrogen peroxide decomposition device configured to decomposed hydrogen peroxide contained in the reduction decontamination solution after a reduction decontamination step; a metal ion exchange resin tower installed at a rear stage of the hydrogen peroxide decomposition device, and configured to supply the reduction decontamination solution after a hydrogen peroxide decomposition step to a cation exchange resin tower and remove a metal ion contained in the reduction decontamination solution; and a pipe connecting the reduction decontamination solution injection device, the hydrogen peroxide decomposition device, and the metal ion exchange resin tower.

The more specific configuration of the invention is described in the scope of claims.

According to the invention, it is possible to provide a chemical decontamination method and a chemical decontamination apparatus capable of preventing the deterioration of the metal ion exchange resin and performing decontamination at a low cost in a short time.

Problems, configurations and effects other than the above will be apparent with reference to the description of the following embodiments.

DESCRIPTION OF THE PREFERRED EMBODIMENTS

The inventors have conducted diligent studies in order to solve the above-mentioned problems. As described above, there are two generation sources of hydrogen peroxide in the chemical decontamination. In Patent Literature 1, the catalyst tower is installed downstream of the cation exchange resin, and thus hydrogen peroxide from the above-mentioned two generation sources (1) and (2) may be supplied to the cation exchange resin tower. In addition, in Patent Literature 2, the catalyst tower is installed in front of the cation resin, and thus hydrogen peroxide from the generation source (1) may be decomposed, but hydrogen peroxide from the generation source (2) may be supplied to the cation exchange resin tower. In this way, in an apparatus configuration in the related art, hydrogen peroxide may be passed through the cation exchange resin, and the cation exchange resin may deteriorate.

Therefore, the inventors have found that an inflow of hydrogen peroxide into the cation exchange resin may be prevented by passing through a catalyst capable of decomposing hydrogen peroxide between the inside of the reactor and the cation exchange resin, different from a catalyst tower for decomposing the reducing agent in the related art. The invention is based on this finding.

Figure 5:
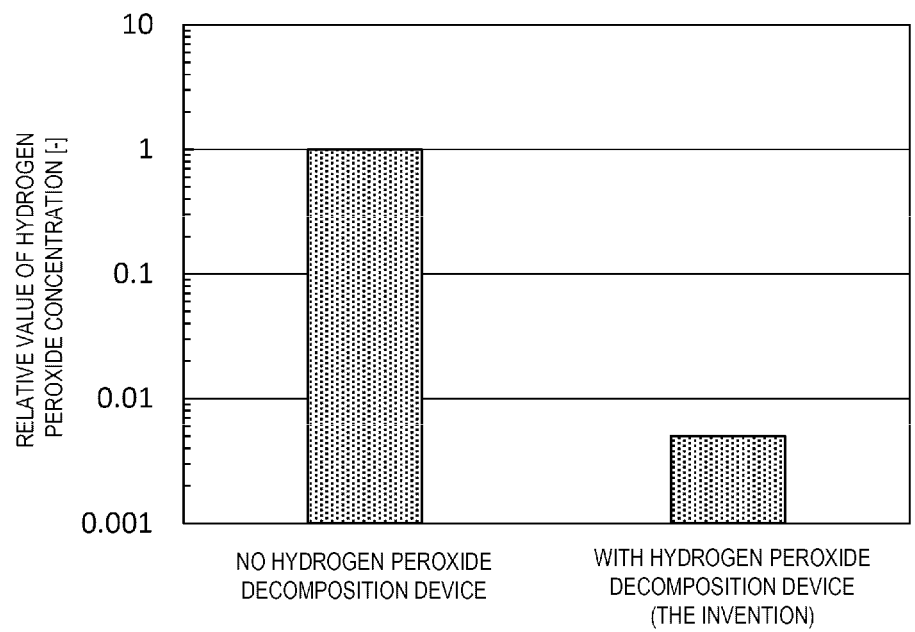
FIG. 5 is a graph showing a hydrogen peroxide decomposition effect of the chemical decontamination apparatus.

Experiments in which the above-mentioned finding is found will be described in more detail. FIG. 5 is a graph showing a hydrogen peroxide decomposition effect of a chemical decontamination apparatus. In the graph, "with hydrogen peroxide decomposition device" represents a value obtained by passing an aqueous solution containing about 2000 ppm of hydrogen peroxide through an activated carbon catalyst produced by spreading ruthenium and measuring a concentration of hydrogen peroxide in the aqueous solution after passing through. "No hydrogen peroxide decomposition device" represents a value of a concentration of hydrogen peroxide in the aqueous solution in a case of not passing through the activated carbon catalyst. As shown in FIG. 5, it is found that the concentration of hydrogen peroxide before and after passing through the catalyst becomes about 1/200, and hydrogen peroxide can be significantly removed after passing through the catalyst.

In addition, passing through the cation resin is carried out from a reduction decontamination step to a reduction decontamination solution decomposition step, and thus the reduction decontamination solution may be decomposed and the decontamination efficiency may be lowered when a reduction decontamination solution during reduction decontamination with almost no hydrogen peroxide is passed through the catalyst. Therefore, a residual rate of the reduction decontamination solution when the reduction decontamination solution is passed through the catalyst was measured and the influence on the decontamination efficiency was investigated.

Figure 6:
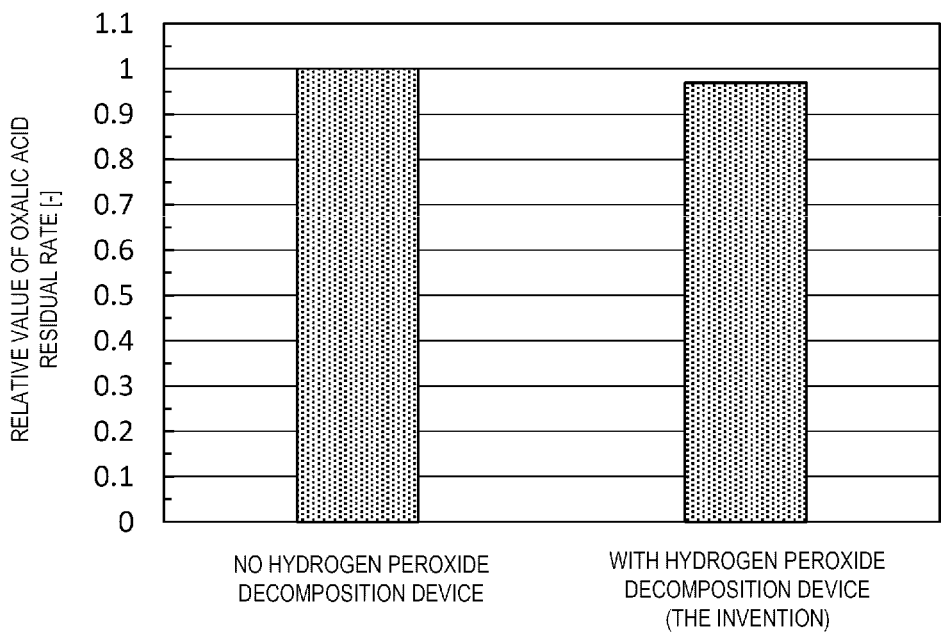
FIG. 6 is a graph showing a residual rate of oxalic acid when oxalic acid is passed through the chemical decontamination apparatus.

Specifically, the residual rate of oxalic acid as a reducing agent was evaluated by being passed through the catalyst while heating, to 90° C., an aqueous solution, which contained about 2000 ppm of oxalic acid and whose pH was adjusted to about 2.3 by hydrazine, and measuring the concentration of oxalic acid after passing through the catalyst for 72 hours. FIG. 6 is a graph showing the residual rate of oxalic acid when oxalic acid is passed through the chemical decontamination apparatus.

Figure 7:
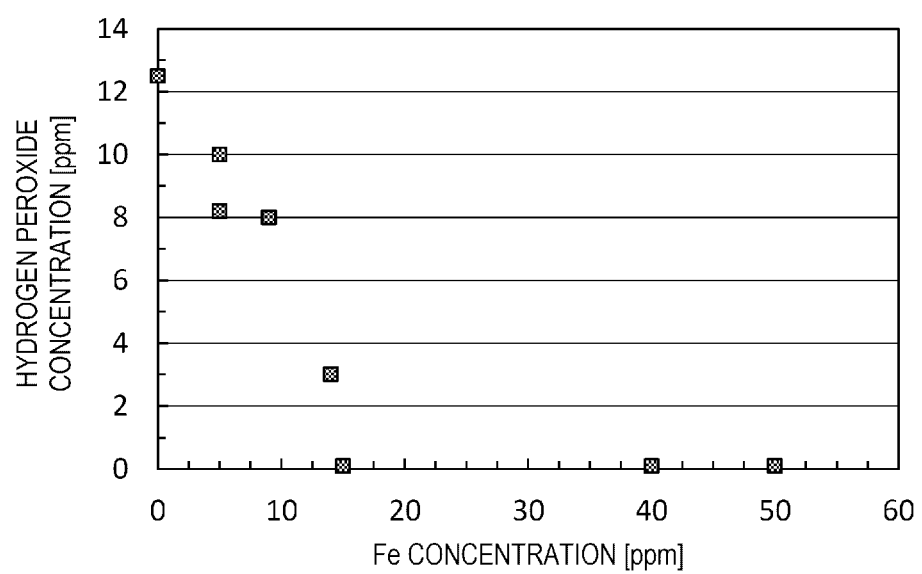
FIG. 7 is a graph showing a Fe concentration dependency of the hydrogen peroxide decomposition effect.

From this result, it is found that the residual rate of oxalic acid after passing through the catalyst is 95% or more, and there is almost no influence on the decontamination efficiency. In addition, Fe elutes into the decontamination solution due to the dissolution of an oxide film during the reduction decontamination. Fe serves as a decomposition catalyst of hydrogen peroxide, and therefore it is examined whether passing through a hydrogen peroxide decomposition device during the reduction decontamination is necessary. A 90° C. test solution containing about 10 ppm of hydrogen peroxide and Fe was stirred for 30 minutes. The test solution after 30 minutes was sampled to investigate the Fe concentration dependency of hydrogen peroxide after minutes. FIG. 7 is a graph showing the Fe concentration dependency of the hydrogen peroxide decomposition effect. The result suggests that when the Fe concentration is 15 ppm or less, the decomposition of hydrogen peroxide does not proceed and hydrogen peroxide remains in the test solution. Therefore, it is more preferable to pass hydrogen peroxide through the hydrogen peroxide decomposition device when the oxide film is dissolved during the reduction decontamination and the Fe concentration is low.

Based on the above test results, it is found that when a catalyst capable of decomposing hydrogen peroxide is provided between the inside of the reactor and the cation exchange resin tower, the deterioration of the cation resin due to hydrogen peroxide can be prevented without influencing the reduction decontamination performance. Further, it is found that the hydrogen peroxide decomposition device is effective when the Fe concentration is low even during the reduction decontamination.

Hydrogen peroxide can be decomposed even in the catalyst tower used in Patent Literature 5 and the like, but is provided at a rear stage of the cation exchange resin tower for the purpose of decomposing the reduction decontamination solution. Meanwhile, the catalyst of the invention is intended to decompose hydrogen peroxide and is provided at a front stage of the cation exchange resin tower. That is, the catalyst of the invention has a provision purpose and installation position different from those of the previously applied ones, and can obtain a different effect of preventing the deterioration of the cation exchange resin.

A preferred embodiment of the chemical decontamination method capable of preventing the deterioration of the cation exchange resin, which reflects the above examination results, will be described below.

Embodiment

[Chemical Decontamination Apparatus]

Firstly, a chemical decontamination apparatus, which is a preferred embodiment of the invention, will be described with reference to FIGS. 1 and 2. A chemical decontamination method of the present embodiment is applied to a boiling water nuclear power generation plant (BWR plant).

Figure 3:
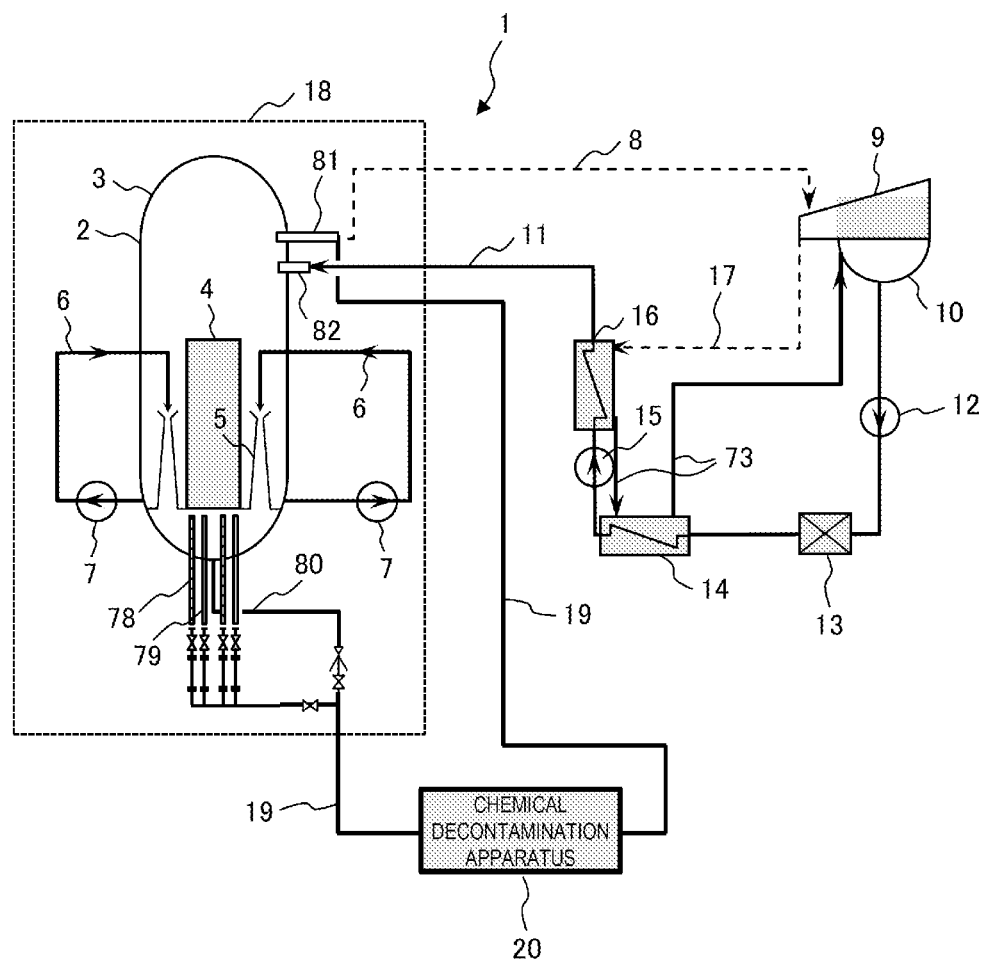
FIG. 3 is a schematic diagram of a boiling water nuclear power generation plant including a chemical decontamination apparatus according to the embodiment.

A schematic configuration of this BWR plant will be described with reference to FIG. 3. FIG. 3 is a schematic diagram of the boiling water nuclear power generation plant including the chemical decontamination apparatus of the embodiment. As shown in FIG. 3, a boiling water nuclear power generation plant (BWR plant) 1 includes a nuclear reactor 2, a turbine 9, a condenser 10, a recirculation system, a reactor cleanup system, and a feed water system. The nuclear reactor 2 is a steam generation device and includes a reactor pressure vessel (hereinafter, referred to as RPV) 3 with a built-in reactor core 4, and a plurality of jet pumps 5 are installed in an annular downcomer formed between an outer surface of a reactor core shroud (not shown) surrounding the reactor core 4 in the PRV 3 and an inner surface of the RPV 3. The reactor core 4 is loaded with a plurality of fuel assemblies (not shown). Each fuel assembly includes a plurality of fuel rods filled with a plurality of fuel pellets produced from a nuclear fuel material.

The recirculation system includes a recirculation system pipe 6 made of stainless steel and a recirculation pump 7 installed at the recirculation system pipe 6. In the feed water system, a condensate pump 12, a condensate cleanup device (for example, a condensate desalter) 13, a low-pressure feed water heater 14, a feed water pump 15, and a high-pressure feed water heater 16 are installed at a feed water pipe 11, which communicates the condenser 10 and the RPV 3, in this order from the condenser 10 to the RPV 3. The nuclear reactor 2 is installed in a primary containment vessel 18 arranged in a reactor building (not shown).

Cooling water (hereinafter, referred to as reactor water) in the RPV 3 is boosted by the recirculation pump 7 and injected into the jet pump 5 through the recirculation system pipe 6. The reactor water existing around a nozzle of the jet pump 5 in the downcomer is also sucked into the jet pump 5 and supplied to the reactor core 4 together with the cooling water injected into the jet pump 5. The reactor water supplied to the reactor core 4 is heated by heat generated by nuclear fission of the nuclear fuel material in the fuel rods of the fuel assemblies, and a part of the reactor water becomes steam. The steam is guided from the RPV 3 through a main steam pipe 8 to the turbine 9 to rotate the turbine 9. A generator (not shown) connected to the turbine 9 rotates to generate electric power. The steam discharged from the turbine 9 is condensed into water by the condenser 10. The water is supplied as feed water into the RPV 3 through the feed water pipe 11. The feed water that flows through the feed water pipe 11 is boosted by the condensate pump 12, has impurities removed by the condensate demineralizer 13, and is further boosted by the feed water pump 15. The feed water is heated by extraction steam extracted from the turbine 9 by an extraction pipe 17 in the low-pressure feed water heater 14 and the high-pressure feed water heater 16 and guided into the RPV 3. Drain water collection pipes 73, which are connected to the high-pressure feed water heater 16 and the low-pressure feed water heater 14, are connected to the condenser 10.

In the chemical decontamination method of the present embodiment, as shown in FIG. 3, temporary circulation pipes 19 (pipes and hoses) are attached to lower and upper portions of the RPV and connected to a chemical decontamination apparatus 20. Connection candidates for the lower portion of the RPV specifically include a CRD housing 78, an ICM housing 79, and an RPV bottom drain line 80. The connection candidates may be used alone or in combination, but it is more preferable to use the connection candidates in combination from a viewpoint of increasing a circulation flow rate. Connection candidates of the upper portion of the RPV specifically include a steam outlet nozzle 81, a feed water system nozzle 82, and a reactor core spray nozzle (not shown). When the RPV 3 is completely filled with the decontamination solution, the steam outlet nozzle 81 that can reduce a residence portion on the upper portion of the RPV is suitable. In FIG. 3, the lower portion of the RPV is connected to the CRD housing 78, the ICM housing 79, and the RPV bottom drain line 80, and the upper portion of the RPV is connected to the steam outlet nozzle 81.

Figure 2:
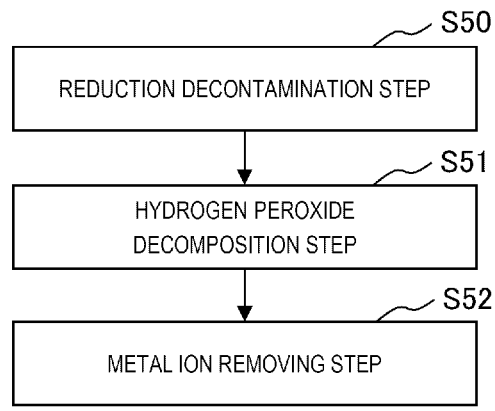
FIG. 2 is a flowchart showing details of step S5 in FIG. 1.
Figure 4:
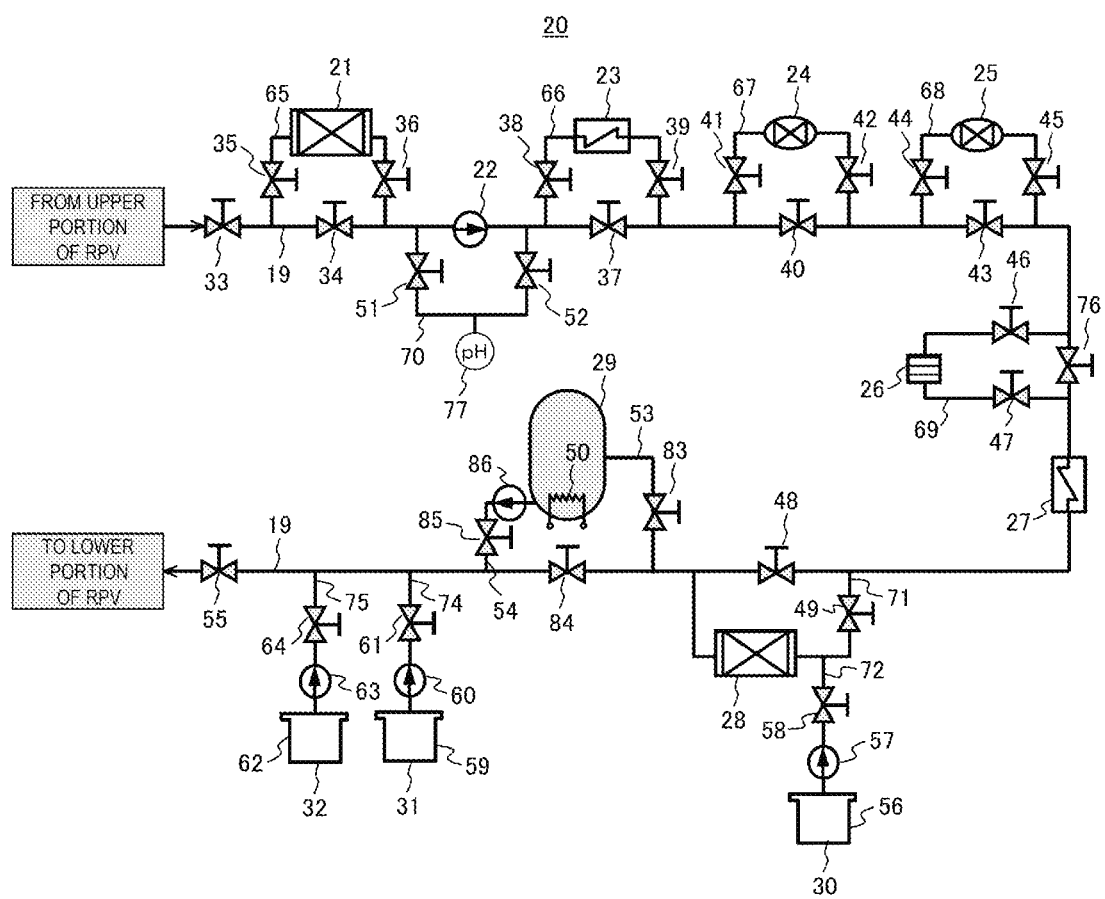
FIG. 4 is a diagram showing details of the chemical decontamination apparatus in FIG. 2.

FIG. 4 is a diagram showing details of the chemical decontamination apparatus in FIG. 2. A detailed configuration of the chemical decontamination apparatus 20 will be described with reference to FIG. 4.

The chemical decontamination apparatus 20 includes the circulation pipe 19, a hydrogen peroxide decomposition device 21, a circulation pump 22, a cooler 23, a mixed bed resin tower 24, a cation (metal ion) exchange resin tower 25, a filter 26, a heater 27, a reduction decontamination solution decomposition device 28, a multipurpose tank 29, a hydrogen peroxide injection device 30, an oxidizing agent injection device 31, and a reduction decontamination solution supply device 32.

An on-off valve 33, a valve 34, the circulation pump 22, valves 37, 40, 43, and 46, the heater 27, a valve 84, and an on-off valve 55 are provided at the circulation pipe 19 in this order from an upstream. A pipe 65 that bypasses the valve 34 is connected to the circulation pipe 19, and valves 35 and 36 and the hydrogen peroxide decomposition device 21 are disposed at the pipe 65. The hydrogen peroxide decomposition device 21 is filled with, for example, an activated carbon catalyst produced by spreading ruthenium on the surface of activated carbon.

The cooler 23 and valves 38 and 39 are installed at a pipe 66 that bypasses the valve 37 and whose two ends are connected to the circulation pipe 19. The mixed bed resin tower 24 and valves 41 and 42 are installed at a pipe 67 whose two ends are connected to the circulation pipe 19 and that bypasses the valve 40. The cation exchange resin tower 25 and valves 44 and 45 are installed at a pipe 68 whose two ends are connected to the circulation pipe 19 and that bypasses the valve 43. The cation exchange resin tower 25 is filled with a cation exchange resin, and the mixed bed resin tower 24 is filled with a cation exchange resin and an anion exchange resin. A pipe 69 that bypasses a valve 76 is connected to the circulation pipe 19, and the valve 46 and the filter 26 are installed at the pipe 69. The heater 27 is connected to the circulation pipe 19.

A pipe 71 at which the reduction decontamination solution decomposition device 28 located downstream of a valve 49 bypasses a valve 48 and is connected to the circulation pipe 19. The reduction decontamination solution decomposition device 28 is filled with, for example, an activated carbon catalyst produced by spreading ruthenium on the surface of activated carbon. A pipe 53 installed to bypass the valve 84 is connected to the multipurpose tank 29. The heater 50 is disposed inside the multipurpose tank 29.

A hopper (not shown) for supplying oxalic acid (reduction decontamination solution) used for reducing and dissolving contaminants on the inner surface of the RPV 3 into the multipurpose tank 29 is provided. A pipe 54 for injecting oxalic acid in the multipurpose tank 29 into the circulation pipe 19 from the multipurpose tank 29 is connected to the circulation pipe 19 between the valves 84 and 55. An oxalic acid supply pump 86 and a valve 85 are installed at the pipe 54.

The oxidizing agent injection device 31 includes a chemical solution tank 59, a supply pump 60, and an injection pipe 74. The chemical solution tank 59 is connected to the circulation pipe 19 via the supply pump 60 and the injection pipe 74 provided with a valve 61. The chemical solution tank 59 is filled with an aqueous solution of permanganic acid, which is an oxidizing agent.

The reduction decontamination solution supply device 32 includes a chemical solution tank 62, a supply pump 63, and an injection pipe 75. The chemical solution tank 62 is connected to the circulation pipe 19 via the supply pump 63 and the injection pipe 75 provided with a valve 64. The chemical solution tank 62 is filled with an aqueous solution of hydrazine, which is a reducing agent. The injection pipes 74 and 75 are connected to the circulation pipe 19 between the valve 84 and the on-off valve 55.

The hydrogen peroxide injection device 30 includes a chemical solution tank 56, a supply pump 57, and an injection pipe 72. The chemical solution tank 56 is connected to the pipe 71 via the supply pump 57 and the injection pipe 72 provided with a valve 58. The chemical solution tank 56 is filled with hydrogen peroxide, which is an oxidizing agent. This hydrogen peroxide is used as a chemical substance used for decomposing oxalic acid and a reducing agent (for example, hydrazine) in the reduction decontamination solution decomposition device 28.

A PH meter 77 is attached to the circulation pipe 19 between valves 51 and 52.

[Chemical Decontamination Method]

Figure 1:
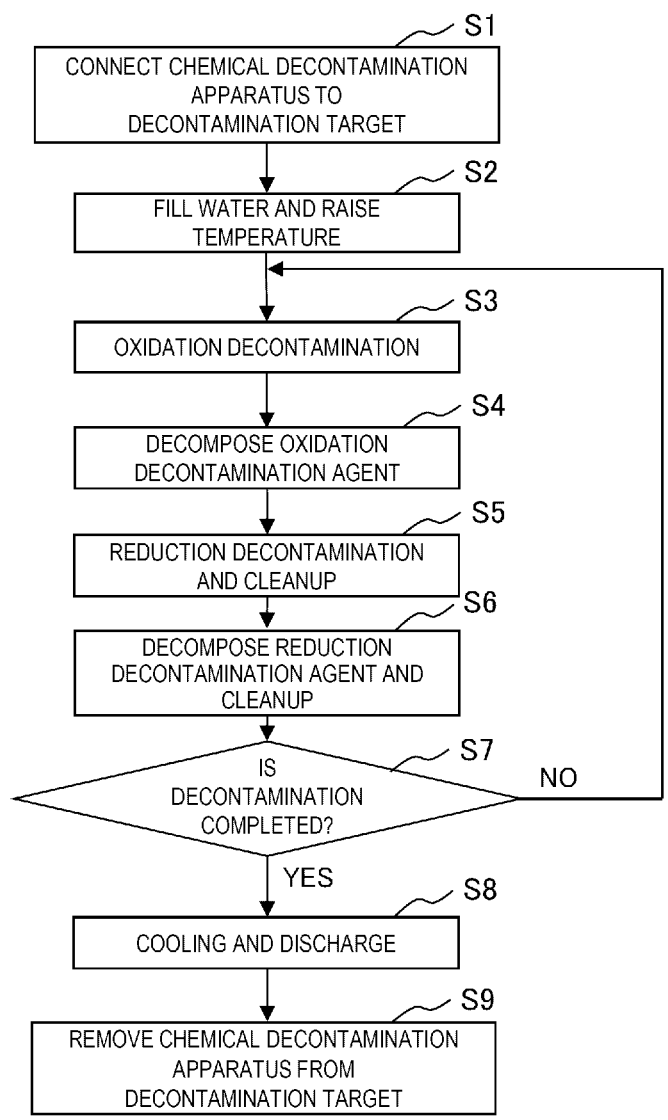
FIG. 1 is a flowchart showing a chemical decontamination method according to an embodiment.

FIG. 1 is a flowchart showing the chemical decontamination method of the present embodiment, and FIG. 2 is a flowchart showing details of step S5 in FIG. 1. The chemical decontamination method of the present embodiment will be described below based on procedures shown in FIGS. 1 and 2. In the present embodiment, the chemical decontamination method described in Patent Literature 1 is used as an example of the chemical decontamination. In the chemical decontamination method of the present embodiment, the chemical decontamination apparatus 20 is used, and each step of steps S1 to S8 shown in FIG. 1 is implemented.

Firstly, the chemical decontamination apparatus 20 is connected to a decontamination target (step S1). For example, the lower portion of the RPV is connected to the circulation pipe 19 by cutting lower portions of the CRD housing 78 and the ICM housing 79 and attaching a connection jig. The upper portion of the RPV is connected to the circulation pipe 19 by cutting one of the plurality of steam outlet nozzles 81 and attaching a connection jig. Steam outlet nozzles other than the cut one are attached to a closing jig and are closed such that the decontamination solution does not flow. At this time, a reactor core spray nozzle (not shown), etc. is attached to the closing jig and is closed such that the decontamination solution does not flow out of the RPV. Both ends of the circulation pipe 19 are connected to a pipe connected to the RPV 3, and a closed loop including the RPV 3 is formed.

In the present embodiment, the chemical decontamination apparatus 20 is connected to the CRD housing 78, the ICM housing 79, and the steam outlet nozzles 81, but may also be connected by using pipes connected to the RPV 3 other than the above. In the present embodiment, the RPV 3 is the decontamination target, but the chemical decontamination method of the nuclear power plant of the present embodiment may be applied by connecting the chemical decontamination apparatus 20 to any one of pipes of a residual heat removing system, a cooling system for isolation from the nuclear reactor, a reactor core spray system, and the feed water system.

Each step of steps S2 to S8 described below will be implemented on the RPV 3 by the chemical decontamination apparatus 20.

The temperature of water used for the chemical decontamination is raised (step S2). Firstly, the chemical decontamination apparatus 20 and the RPV 3 are filled with water. This water filling is carried out by using, for example, a reactor auxiliary cooling water system (RCW). The circulation pump 22 is driven in a state in which the on-off valve 33, the valves 34, 37, 40, 43, 76, 48, and 84, and the on-off valve 55 are open, and other valves are closed. Accordingly, water in the RPV 3 and the chemical decontamination apparatus 20 is heated to 90° C. by the heater 27 and circulates in the closed loop formed by the circulation pipe 19 and the RPV 3.

Next, M oxidation decontamination is carried out (step S3). The valve 61 is open when the temperature of the water described above reaches 90° C. A permanganic acid aqueous solution in the chemical solution tank 59 is injected into the water flowing through the circulation pipe 19 via the injection pipe 74 by starting the supply pump 60, and thus an oxidation decontamination solution (permanganic acid aqueous solution) is generated in the circulation pipe 19 and the RPV 3. The permanganic acid concentration in the oxidation decontamination solution at this time is, for example, 200 ppm. The supply pump 60 is stopped to stop the injection of permanganic acid after reaching a predetermined permanganic acid concentration. The valve 61 is closed after stopping the injection. The oxidation decontamination solution circulates in the closed loop formed by the circulation pipe 19 and the RPV 3 to implement the oxidation decontamination. The oxidation decontamination is completed when the oxidation decontamination time of the RPV 3 reaches a predetermined time.

Subsequently, permanganic acid contained in the oxidation decontamination solution is decomposed (step S4). A predetermined amount of oxalic acid is guided into the multipurpose tank 29. Oxalic acid dissolves in water in the multipurpose tank 29, and an oxalic acid aqueous solution is generated in the multipurpose tank 29. The oxalic acid aqueous solution is discharged from the multipurpose tank 29 through the pipe 54 to the circulation pipe 19 by driving the supply pump 86. The supply pump 86 is stopped to stop the injection of the oxalic acid aqueous solution after a predetermined amount of the oxalic acid aqueous solution is injected to the oxidation decontamination solution. The valve 85 is closed after stopping the injection of the oxalic acid aqueous solution. The decomposition step of the oxidizing agent is completed after confirming that the oxidation decontamination solution has changed from purple to colorless and transparent.

Next, a reduction decontamination solution is supplied to the RPV 3 to perform reduction decontamination (step S5). In preparation for the reduction decontamination, the valves 44 and 45 are open and the valve 43 is closed, whereby the decomposed oxidation decontamination solution is passed through the cation exchange resin tower 25. Similar to step S4, an oxalic acid aqueous solution (reduction decontamination solution) is prepared in the multipurpose tank 29, and is injected into the circulation pipe 19 from the multipurpose tank 29 to the pipe 54 by driving the supply pump 86. The supply pump 86 is stopped to stop the injection of the oxalic acid aqueous solution after a predetermined amount of the oxalic acid aqueous solution is injected to the water flowing through the circulation pipe 19. The valve 85 is closed after stopping the injection of the oxalic acid aqueous solution.

In order to adjust a pH, a hydrazine aqueous solution in the chemical solution tank 62 of the reduction decontamination solution supply device 32 is injected into the oxalic acid aqueous solution in the circulation pipe 19 through the injection pipe 75 by opening the valve 64 to drive the supply pump 63. The pH of the oxalic acid aqueous solution is adjusted to 2.5 by controlling the supply pump 63 (or an opening of the valve 64) based on a pH valve of the oxalic acid aqueous solution measured by the pH meter 77 and adjusting an injection amount of the hydrazine aqueous solution into the circulation pipe 19. The 90° C. oxalic acid aqueous solution (reduction decontamination solution) having a pH of 2.5 circulates in the closed loop formed by the circulation pipe 19 and the RPV 3 to implement the reduction decontamination. Oxalic acid in the aqueous solution dissolves the oxide film containing radionuclides formed on the surface of the member constituting the inside of the RPV 3.

As shown in FIG. 2, a reduction decontamination and cleanup step S5 includes a reduction decontamination step S50, a hydrogen peroxide decomposition step S51, and a metal ion removing step S52. With the dissolution of the oxide film, the metal ions (radionuclides concentration and Fe concentration) of the oxalic acid aqueous solution increase. The metal ions contained in the oxalic acid aqueous solution are adsorbed in the cation exchange resin tower 25 and removed. The oxalic acid aqueous solution discharged from the cation exchange resin tower 25 is supplied again to the RPV 3 from the circulation pipe 19 and used for the reduction decontamination of the RPV 3. When the Fe concentration in the reduction decontamination solution from the RPV 3 to the cation exchange resin tower 25 is 15 ppm or less, hydrogen peroxide generated by radiolytic decomposition of water due to the high dose in the reactor is not decomposed by the catalyst action of Fe. Therefore, when the Fe concentration is 15 ppm or less, the reduction decontamination solution flowing through the circulation pipe 19 is passed through the hydrogen peroxide decomposition device 21 upstream of the cation exchange resin tower 25 by opening the valve 35 and closing the valve 34. Accordingly, the generated hydrogen peroxide is not supplied to the cation exchange resin tower 25, and thus the deterioration of the cation exchange resin is prevented. Therefore, there is no need to add work (for example, decomposition of a TOC component by injection of an oxidizing agent) when the cation resin is deteriorated.

The reduction decontamination is completed when a dose rate at a reduction decontamination site decreases to a set dose rate, or when the reduction decontamination time of the RPV 3 reaches a predetermined time. The fact that the dose rate at the reduction decontamination site of the RPV 3 decreases to the set dose rate can be confirmed by a dose rate obtained based on an output signal of a radiation detector that detects the radiation from the reduction decontamination site of the RPV 3.

Oxalic acid and hydrazine contained in the reduction decontamination solution are decomposed (step S6). The decomposition of oxalic acid and hydrazine is carried out as follows. The valve 49 is open to reduce a part of the opening of the valve 48. The oxalic acid aqueous solution containing hydrazine is supplied to the reduction decontamination solution decomposition device 28 through the pipe 71 after passing through the valve 49. At this time, hydrogen peroxide in the chemical solution tank 56 is supplied to the reduction decontamination solution decomposition device 28 through the supply pipe 72 and the pipe 71 by opening the valve 58 to drive the supply pump 57. Oxalic acid and hydrazine contained in the oxalic acid aqueous solution are decomposed by actions of the activated carbon catalyst and the supplied hydrogen peroxide in the reduction decontamination solution decomposition device 28. Decomposition reactions of oxalic acid and hydrazine in the reduction decontamination solution decomposition device 28 are represented by a Formula (2) and a Formula (3).

$$(COOH)_2 + H_2O_2 \rightarrow 2CO_2 + 2H_2O \quad \text{Formula (2)}$$

$$N_2H_4 + 2H_2O_2 \rightarrow N_2 + 4H_2O \quad \text{Formula (3)}$$

The decomposition reactions of oxalic acid and hydrazine in the reduction decontamination solution decomposition device 28 are carried out while circulating the oxalic acid aqueous solution in the closed loop including the circulation pipe 19 and the RPV. The supply amount of hydrogen peroxide from the chemical solution tank 56 to the reduction decontamination solution decomposition device 28 is adjusted by controlling a rotation speed of the supply pump 57 such that the supplied hydrogen peroxide, in order to decompose oxalic acid and hydrazine, is completely consumed in the reduction decontamination solution decomposition device 28 and does not flow out from the reduction decontamination solution decomposition device 28.

However, hydrogen peroxide equal to or lower than the lower limit of analysis may flow out from the reduction decontamination solution decomposition device 28. In the above-mentioned step S5, when the reduction decontamination solution flowing through the circulation pipe 19 does not pass through the hydrogen peroxide decomposition device 21, the valve 35 is open and the valve 34 is closed before starting the injection of hydrogen peroxide, so that the reduction decontamination solution flowing through the circulation pipe 19 passes through the hydrogen peroxide decomposition device 21. Accordingly, hydrogen peroxide flowing out from the reduction decontamination solution decomposition device 28 is not supplied to the cation exchange resin tower 25, and thus the deterioration of the cation exchange resin is prevented.

When the oxalic acid concentration falls to be equal to or lower than a predetermined value, the supply pump 57 is stopped and the valve 58 is closed to stop the injection of hydrogen peroxide. For example, when the oxalic acid concentration in the oxalic acid aqueous solution falls to be 30 ppm or less, the injection of hydrogen peroxide is stopped. Decompositions of oxalic acid and hydrazine are completed with the completion of the injection of hydrogen peroxide.

The completion of the chemical decontamination is determined (step S7). When a surface dose rate at the decontaminated site has not decreased to a target value even after the predetermined time for the reduction decontamination is reached, the steps from step S3 to step S6 are repeated. For example, the target value is the surface dose rate at which a decontamination factor (DF) is 10, and the number of repetitions is 2 to 3 times. Even when the surface dose rate at the decontaminated site has not decreased to the set dose rate as a result of repeating the decontamination 2 to 3 times, if the surface dose rate has decreased to a background level, the method proceeds the next step S8.

The aqueous solution remaining in the RPV 3 and the circulation pipe 19 is cleaned up and discharged (step S8). The water flowing through the circulation pipe 19 is passed through the cooler and cooled to 60° C. or lower by opening the valves 38 and 39 and closing the valve 37. The water of 60° C. or lower and flowing through the circulation pipe 19 is passed through the mixed bed resin tower by opening the valves 41 and 42 and closing the valve 40. When the water flowing through the circulation pipe 19 meets a discharge standard and the oxalic acid concentration falls to be equal to or lower than the predetermined value, the cleanup of the water flowing through the circulation pipe 19 is completed. After the completion of the cleanup, the water flowing through the circulation pipe 19 is discharged.

Pipe systems are removed from the chemical decontamination apparatus (step S9). The chemical decontamination apparatus 20 is removed from the RPV 3 after implementing each step of the step of S1 to S8.

As described above, each step of the chemical decontamination is completed.

As described above, according to the invention, it is possible to provide a chemical decontamination method and a chemical decontamination apparatus capable of preventing the deterioration of the cation exchange resin and performing decontamination at a low cost in a short time.

Specifically, according to the present embodiment, hydrogen peroxide contained in the decontamination solution can be significantly reduced by passing the decontamination solution containing hydrogen peroxide generated by the radiolytic decomposition of water in the reactor or hydrogen peroxide flowing out from the reducing agent decomposition device through the hydrogen peroxide decomposition device before passing the same through the cation exchange resin tower, and thus it is possible to prevent the deterioration of the metal ion exchange resin and perform decontamination at a low cost in a short time.

According to the above-described configuration, hydrogen peroxide contained in the reduction decontamination solution can be decomposed without stopping the water flow of the reduction decontamination solution. In the related art, there is a configuration in which hydrogen peroxide contained in the decontamination solution is decomposed by UV irradiation, but in this case, it is necessary to stop the circulation of the decontamination solution in order to irradiate the decontamination solution with UV.

The invention is not limited to the above-mentioned embodiment, and includes various modifications. For example, the above-mentioned embodiment has been described by taking the chemical decontamination of the RPV as an example in order to easily understand the invention, and the invention can be applied to a recirculation system other than the RPV, a reactor water cleanup system, a residual heat removing system, and the like.

In addition, the invention can also be applied to other chemical decontamination methods other than the above-mentioned HOP method and HOP (II) method. Other chemical decontamination methods include the CORD method (including CORD-UV and CORD-D). In addition, a T-OZON method can also be included. Further, a LOMI method and a CITRIX method can also be included.

In addition, a DfD method can also be included. A CAN-DECON method can also be included. A CAN-DEREM method can also be included.

Depending on the chemical decontamination method, there are cases in which devices not shown in FIG. 1 may be required, or a part of devices shown in FIG. 1 may be omitted, and addition, omission, replacement, modification, and the like of device configurations may be performed without departing from the summary of the invention.

What is claimed is:

1. A chemical decontamination method comprising:
   a reduction decontamination step of supplying a reduction decontamination solution to a decontamination target portion made of stainless steel;
   performing reduction decontamination on a surface of a member constituting the decontamination target portion;
   a hydrogen peroxide decomposition step of decomposing hydrogen peroxide contained in the reduction decontamination solution after the reduction decontamination step by using a hydrogen peroxide decomposition device which is directly connected to the decontamination target portion via a temporary circulation pipes downstream of the decontamination target portion that decomposes hydrogen peroxide, when an iron concentration in the reduction decontamination solution becomes a predetermined concentration or less; and
   a metal ion removing step of removing a metal ion contained in the reduction decontamination solution after the hydrogen peroxide decomposition step by using a metal ion exchange resin tower that removes metal ions, which is installed downstream of the hydrogen peroxide decomposition device and upstream of the decontamination target portion.

2. The chemical decontamination method according to claim 1, further comprising:
   a reduction decontamination solution decomposition step of adding hydrogen peroxide to the reduction decontamination solution after the metal ion removing step and decomposing the reduction decontamination solution to which the hydrogen peroxide is added; and
   a second hydrogen peroxide decomposition step of decomposing hydrogen peroxide contained in the reduction decontamination solution after the reduction decontamination solution decomposition step.

3. The chemical decontamination method according to claim 1, wherein in the hydrogen peroxide decomposition step, at least one of activated carbon, a noble metal, manganese dioxide, and catalase is used as a hydrogen peroxide decomposition catalyst by using the hydrogen peroxide decomposition device.

4. The chemical decontamination method according to claim 3, wherein the noble metal is at least one of platinum, ruthenium, palladium, iridium, and rhodium.

5. The chemical decontamination method according to claim 2, wherein in the reduction decontamination solution decomposition step, activated carbon with ruthenium spread on the surface is used as a catalyst.

6. The chemical decontamination method according to claim 1, wherein the reduction decontamination solution is at least one of oxalic acid, malonic acid, formic acid, and ascorbic acid.

7. The chemical decontamination method according to claim 1, wherein hydrazine is mixed with the reduction decontamination solution to adjust a pH of the reduction decontamination solution.

8. The chemical decontamination method according to claim 1, wherein
   before the reduction decontamination step, there is an oxidation decontamination step in which an oxidation decontamination solution is supplied to the decontamination target portion, and the surface of a member constituting the decontamination target portion is oxidized and decontaminated.

* * * * *